United States Patent
Ture

(10) Patent No.: US 9,276,425 B2
(45) Date of Patent: Mar. 1, 2016

(54) POWER MANAGEMENT SYSTEMS WITH DYNAMIC TARGET STATE OF CHARGE

(71) Applicant: Younicos, Inc., Kyle, TX (US)

(72) Inventor: Evan Ture, Buda, TX (US)

(73) Assignee: YOUNICOS INC., Kyle, TX (US)

( * ) Notice: Subject to any disclaimer, the term of this patent is extended or adjusted under 35 U.S.C. 154(b) by 386 days.

(21) Appl. No.: 13/729,450

(22) Filed: Dec. 28, 2012

(65) Prior Publication Data

US 2014/0184136 A1    Jul. 3, 2014

(51) Int. Cl.
H02J 7/00    (2006.01)

(52) U.S. Cl.
CPC ................... H02J 7/0052 (2013.01)

(58) Field of Classification Search
CPC ......... H02J 7/0013; H02J 3/382; H02J 3/383; H02J 3/386; H02J 3/32; H02J 7/007; H02J 7/34; H02J 11/00; H02J 3/28; H02J 7/0052; Y02E 10/723; Y02E 70/30; F03D 7/028; F03D 7/048; F03D 9/02

See application file for complete search history.

(56) References Cited

U.S. PATENT DOCUMENTS

| | | |
|---|---|---|
| 5,274,571 A | 12/1993 | Hesse et al. |
| 5,369,353 A | 11/1994 | Erdman |
| 5,563,802 A | 10/1996 | Plahn et al. |
| 5,710,501 A | 1/1998 | Van Phuoc et al. |
| 6,522,031 B2 | 2/2003 | Provanzana et al. |
| 6,580,977 B2 | 6/2003 | Ding et al. |
| 6,674,265 B2 | 1/2004 | Yoshida et al. |
| 6,747,370 B2 | 6/2004 | Hiroyuki |
| 6,858,953 B2 * | 2/2005 | Stahlkopf ................... 290/44 |
| 6,900,556 B2 | 5/2005 | Provanzana et al. |
| 7,002,260 B2 | 2/2006 | Stahlkopf |
| 7,227,275 B2 | 6/2007 | Hennessy et al. |
| 7,265,456 B2 | 9/2007 | Hennessy |
| 7,298,059 B2 | 11/2007 | Delmerico et al. |
| 7,353,083 B2 | 4/2008 | Hennessy |
| 7,432,611 B2 | 10/2008 | Stahlkopf |
| 7,613,548 B2 | 11/2009 | Cardinal et al. |

(Continued)

FOREIGN PATENT DOCUMENTS

| | | |
|---|---|---|
| JP | 2010-084545 | 4/2010 |
| KR | 10-1092219 B1 | 12/2011 |

(Continued)

OTHER PUBLICATIONS

International Search Report and Written Opinion dated Apr. 9, 2014 for Application No. 208860065WO1.

(Continued)

*Primary Examiner* — Nha Nguyen

(74) *Attorney, Agent, or Firm* — Foley & Lardner LLP

(57) ABSTRACT

A power management system includes an energy storage device and a control system coupled to the energy storage device. The control system is configured to execute a control routine to determine whether to charge or discharge the energy storage device using a target state of charge and a current state of charge of the energy storage device. The control system is configured to determine that an output signal, received from a power generator, is outside of a specified range. The control system is configured to modify the target state of charge of the energy storage device in response to determining that the output signal is outside of the specified range.

18 Claims, 5 Drawing Sheets

(56) References Cited

U.S. PATENT DOCUMENTS

| | | |
|---|---|---|
| 7,622,816 B2 | 11/2009 | Stahlkopf |
| 7,659,698 B2 | 2/2010 | Elder et al. |
| 7,679,215 B2 | 3/2010 | Delmerico et al. |
| 7,826,908 B2 | 11/2010 | Cheng et al. |
| 7,890,217 B2 | 2/2011 | Cardinal et al. |
| 7,908,036 B2 | 3/2011 | Kirchner et al. |
| 7,941,246 B2 | 5/2011 | Miller et al. |
| 7,952,232 B2 | 5/2011 | Burra et al. |
| 8,022,674 B2 | 9/2011 | Miura |
| 8,076,789 B2 * | 12/2011 | Miller ............................. 290/44 |
| 8,159,186 B2 | 4/2012 | Iida et al. |
| 8,159,188 B2 | 4/2012 | Anderson |
| 8,185,249 B2 | 5/2012 | Kirchner et al. |
| 8,222,765 B2 | 7/2012 | Collins et al. |
| 8,237,301 B2 | 8/2012 | Delmerico et al. |
| 8,277,964 B2 | 10/2012 | Hennessy |
| 8,288,997 B2 | 10/2012 | Choi et al. |
| 8,301,311 B2 | 10/2012 | Nelson |
| 8,335,547 B2 | 12/2012 | Otterson |
| 8,338,987 B2 | 12/2012 | O'Brien et al. |
| 8,344,550 B2 | 1/2013 | Delmerico et al. |
| 8,373,312 B2 | 2/2013 | O'Brien et al. |
| 8,400,112 B2 | 3/2013 | Anderson |
| 8,452,461 B2 | 5/2013 | Sawyer et al. |
| 8,471,406 B2 | 6/2013 | Patel et al. |
| 8,532,834 B2 | 9/2013 | Delong et al. |
| 2008/0224541 A1 | 9/2008 | Fukuhara |
| 2009/0184835 A1 | 7/2009 | Deaver et al. |
| 2010/0057267 A1 | 3/2010 | Liu et al. |
| 2010/0145533 A1 | 6/2010 | Cardinal et al. |
| 2010/0231045 A1 | 9/2010 | Collins et al. |
| 2011/0001318 A1 | 1/2011 | Nelson |
| 2011/0187106 A1 | 8/2011 | Ichinose et al. |
| 2011/0221276 A1 | 9/2011 | Geinzer et al. |
| 2011/0260677 A1 | 10/2011 | Bando et al. |
| 2011/0273129 A1 * | 11/2011 | Coe et al. ...................... 320/101 |
| 2012/0056588 A1 | 3/2012 | Cai et al. |
| 2012/0248873 A1 | 10/2012 | Oudalov et al. |
| 2012/0256483 A1 | 10/2012 | Nakashima et al. |
| 2012/0256592 A1 | 10/2012 | Baughman |
| 2012/0323396 A1 * | 12/2012 | Shelton et al. ................ 700/297 |
| 2013/0249215 A1 | 9/2013 | Egedal et al. |
| 2013/0257351 A1 | 10/2013 | Nishibayashi et al. |
| 2013/0278203 A1 | 10/2013 | Coe et al. |

FOREIGN PATENT DOCUMENTS

| | | |
|---|---|---|
| KR | 10-2012-0081930 | 7/2012 |
| WO | WO 2009/136975 | 11/2009 |
| WO | WO 2013/068149 A2 | 5/2013 |

OTHER PUBLICATIONS

PCT Notification Concerning Transmittal of International Preliminary Report on Patentability dated Jun. 30, 2015 for PCT/US2013/078050, 7 pages.

* cited by examiner

POWER MANAGEMENT SYSTEMS WITH DYNAMIC TARGET STATE OF CHARGE

TECHNICAL FIELD

This disclosure relates generally to electronics and more particularly to managing the state of charge of an energy storage device.

BACKGROUND

Renewable resources, such as wind and solar energy, are attractive alternatives to the use of fossil fuels for generating power due to their renewable nature and clean operation. However, unlike thermal power plants (e.g., coal fired or natural gas fired plants), generally, the amount of wind or solar energy available at any given time cannot be controlled or reliably predicted. Further, due to the inherent variability of these renewable energy sources, (e.g., wind gusts and/or directional changes, weather conditions, breaking clouds), the instantaneous power output of an associated power generator (e.g., a wind turbine) may vary significantly from one second to the next.

Introducing such variability into the grid may destabilize the grid. For example, a sudden increase in active power may result in a corresponding increase in grid frequency. These increases may result in protective relay tripping, thereby separating portions of the grid and potentially creating a load/generation imbalance in certain portions of the grid. In some cases, such an imbalance may result in a cascading power failure as the grid is further segmented and/or available generation resources trip off-line to prevent damage that may result from the imbalance.

Ramp rate limits help protect the grid from such an event by limiting the rate at which power injected into the grid increases or decreases. By limiting the rate of change in power of generation resources coupled to the grid, grid operators are provided with more time to respond to the change and maintain a load/generation balance.

For wind turbine applications, ramp rate limiting can be implemented by manipulating the wind turbine and/or its controls (e.g., yawing or tilting the plane of rotation, varying the blade pitch, using a passive/active stall mechanism, controlling the output of a variable-speed generator, etc.). However, intentionally reducing power output despite the availability of wind energy (i.e., curtailment) decreases the overall energy efficiency of the system. Similarly, preemptively reducing the power output of a wind turbine generator so that a sudden decrease in wind energy appears less abrupt also decreases the overall energy efficiency of the system.

In some applications, ramp rate limiting may be implemented, at least in part, by using an energy storage device to absorb excess power during a ramp up and/or to supplement power output during a ramp down. Generally, such energy storage devices have a fixed storage capacity. Having a fixed storage capacity typically limits a device's ability to mitigate the risk of exceeding a ramp rate limit (i.e., a ramp rate violation). For example, a system having a 50% state of charge may be able to avoid a ramp rate violation in either direction for finite, and approximately equal, periods of time, assuming equal, worst-case-rates of change and equal ramp rate limits.

In operation, such systems may implement a target state of charge (SOC) around which the storage device is managed. When the SOC of the device drops below this target or moves beyond this target, the energy storage device is controlled such that the SOC returns to the target SOC in preparation for the next event.

Using a target SOC near the center of an energy storage device's charge/discharge capacity increases the probability that the energy storage device will recover to such a level prior to a subsequent event. A centered target SOC also increases the probability that the energy storage device will be available to mitigate a ramp rate violation irrespective of whether the event is a ramp up event or a ramp down event. Such an implementation may improve the efficiency of a ramp-rate-limited power generation facility by minimizing the need to curtail power output for at least a corresponding period of time. The period of time may be increased by increasing the size of the energy storage device and/or by utilizing multiple energy storage devices to provide additional charge/discharge capacity. Outside that time period, other measures may be implemented to avoid a ramp rate violation, e.g., curtailment.

SUMMARY

A power management system includes an energy storage device and a control system coupled to the energy storage device. The control system is configured to execute a control routine to determine whether to charge or discharge the energy storage device using at least a target state of charge and a current state of charge of the energy storage device. The control system is configured to determine that an output signal, received from a power generator, or output measurement, calculated from the output of current and potential measurement devices, is outside of a specified range. The control system is configured to modify the target state of charge of the energy storage device in response to determining that the output signal is outside of the specified range.

In general, one aspect of the subject matter described in this specification can be embodied in methods that include the actions of executing a control routine to determine whether to charge or discharge an energy storage device coupled to a load, including: determining a difference between a current state of charge of the energy storage device and a target state of charge of the energy storage device; receiving an output signal characterizing the output of a power generator coupled to the load; and determining to charge or discharge the energy storage device based on the difference and the output signal; determining that the output signal is outside of a specified range; and modifying the target state of charge of the energy storage device in response to determining that the output signal is outside of the specified range. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Determining that the output signal is outside of the specified range and modifying the target state of charge of the energy storage device comprises: determining that the output signal is below a first threshold and, in response, reducing the target state of charge of the energy storage device; and determining that the output signal is above a second threshold and, in response, increasing the target state of charge of the energy storage device. Determining that the output signal is outside of the specified range comprises determining that the output signal is outside of a specified range for a specified period of time. The power generator is configured to provide intermittent power to the load, and wherein the energy storage device is configured to source power to the load when discharging and sink power from the power generator when charging. The power generator comprises one or more wind turbines, the load is an electrical grid, and the energy storage device comprises one or more batteries, each battery coupled to a respective bidirectional power conversion system. Receiving the output signal from the power generator comprises receiving a value indicating an average or instantaneous power output from the wind turbines. Determining to charge or discharge the energy storage device based on the difference and the output signal comprises: determining that the output signal indicates that the power generator is generating power at an increasing rate above a first threshold rate and, in response, charging the energy storage device; and determining that the output signal indicates that the power generator is generating power at a decreasing rate below a second threshold rate and, in response, discharging the energy storage device. The actions further comprise decreasing the first threshold rate or the second threshold rate or both when the current state of charge of the energy storage device is below the target state of charge of the energy storage device. The actions further comprise increasing the first threshold rate or the second threshold rate or both when the current state of charge of the energy storage device is above the target state of charge of the energy storage device.

Particular implementations of the control system can provide one or more of the following advantages: system efficiency may be improved by reducing the need to curtail available power. In some cases, energy storage devices may be able to provide ramp rate mitigation services for a greater number of power generators, or power generators having a greater generation capacity. In some instances, ramp rate mitigation services may be provided by smaller energy storage devices, thereby decreasing costs. In some generation applications, the compliance of a generation source to given ramp rate limits is measured on a percentage compliance basis, and the control system can increase the compliance percentage of a generation source with an energy storage system without increasing the size of the energy storage system.

The details of one or more disclosed implementations are set forth in the accompanying drawings and the description below. Other features, aspects, and advantages will become apparent from the description, the drawings and the claims.

DETAILED DESCRIPTION

Figure 1:
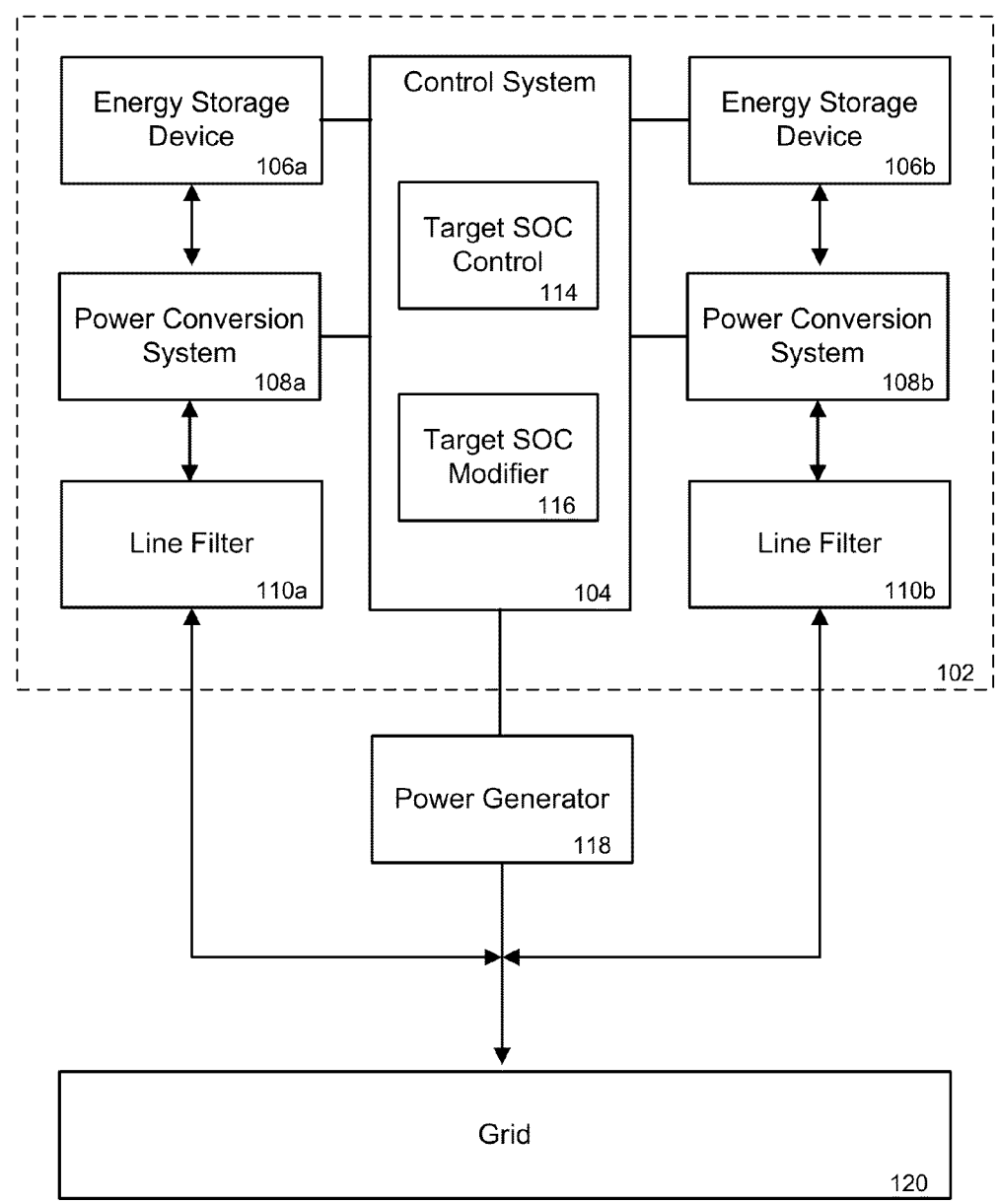
FIG. 1 is a block diagram of an example power generation system including a power management system and a power generator.

FIG. 1 is a block diagram of an example power generation system 100 including a power management system 102 and a power generator 118. The power generator and the power management system are coupled to an electrical grid 120. The power generation system may include other components to manage the connections between the power management system, the power generator, and the grid, e.g., a substation including one or more transformers, fault protection equipment, and the like.

In some implementations, the power generator provides a variable amount of power, e.g., depending on environmental conditions. For example, the power generator can be a wind farm of one or more wind turbines, or a solar power generator of one or more photovoltaic solar panels. The power management system provides one or more services to assist the power generator. For example, the power management system can provide a ramp rate mitigation service to prevent power from the power generator from increasing or decreasing at any more than a threshold rate. Other examples of services include grid voltage regulation, grid frequency regulation, and power smoothing.

The power management system includes a control system 104, energy storage devices 106a and 106b, power conversion systems 108a and 108b, and line filters 110a and 110b. The control system can be implemented, e.g., in a system of one or more computers. The energy storage devices can be, e.g., batteries. The line filters can be, e.g., LC filters of one or more inductors and one or more capacitors configured to filter high frequency harmonics from the power conversion systems.

The power conversion systems can be, e.g., bidirectional power converters that act as inverters when the energy storage devices are discharging to the grid and that act as rectifiers when the energy storage devices are charging using energy from the power generator or the grid. For example, the power conversion systems can be implemented as three-phase sinusoidal pulse-width modulated (PWM) inverters operating in current-controlled mode to generate three-phase sinusoidal output currents. The inverters may include half-bridge or full bridge switching configurations utilizing insulated-gate bipolar transistor (IGBT) modules as switching devices.

The control system receives an output signal characterizing the output of the power generator. The output signal can be, e.g., one or more digital values indicating an instantaneous power output of the power generator, or one or more digital values indicating an average power output of the power generator over a specified period of time. The control system can receive the output signal from the power generator. The control system can alternatively receive the output signal from measurement devices placed on the output of the power generator. The control system also receives information from the energy storage devices, e.g., information specifying a current state of charge. For example, the energy storage devices may provide a reading from a voltage sensor indicating the current voltage of the battery, which the control system can use to determine the current state of charge, or the energy storage devices may directly report the current state of charge.

In some implementations, the control system receives other input. For example, the control system can receive distribution network status information from the grid or the power generator or both. Distribution network status information includes, for example, voltage, current, active power, reactive power, and frequency information derived, e.g., from one or more sensors coupled to the grid.

The control system provides control signals to the power conversions systems that cause the energy storage devices to charge or discharge. For example, the control system can issue target active power settings ("P commands") and target reactive power settings ("Q commands") to the power conversion systems to meet system performance specifications. To provide a ramp rate mitigation service, the control system can cause the energy storage devices to discharge when the power output of the power generator is decreasing faster than a threshold rate (e.g., when the wind dies) and can cause the energy storage devices to charge when the power output of the power generator is increasing faster than a threshold rate (e.g., when the wind gusts).

The control system executes a target state of charge (SOC) control routine 114. In executing the target SOC control routine, the control system determines a difference between the current state of charge of an energy storage device and the target state of charge of the energy storage device. The control system determines to charge or discharge the energy storage device based on the difference and the ramp rate of the power generator.

In some implementations, the control system charges the energy storage device in response to determining that the output signal indicates that the power generator is generating power at an increasing rate above a first threshold rate, and the control system discharges the energy storage device in response to determining that the output signal indicates that the power generator is generating power at a decreasing rate below a second threshold rate. The control system can decrease the first threshold rate or the second threshold rate or both when the current state of charge of the energy storage device is below the target state of charge of the energy storage device, and the control system can increase the first threshold rate or the second threshold rate or both when the current state of charge of the energy storage device is above the target state of charge of the energy storage device.

The control system also executes a target SOC modifier routine 116. In executing the target SOC modifier routine, the control system modifies the target SOC of the target SOC control routine 114. When the control system modifies the target SOC, the current SOC may not immediately change, or may not change at all, depending on the difference between the current SOC and the target SOC and the state of the target SOC control routine. Typically, the target SOC control routine will eventually bring the current SOC closer to the target SOC.

In some implementations, the control system determines that the output signal from the power generator is outside of a specified range, or outside of the specified range for a specified amount of time, and modifies the target SOC in response to determining that the output signal is outside of the specified range. The control system reduces the target state of charge of the energy storage device in response to determining that the output signal is below a first threshold. The control system can increase the target state of charge of the energy storage device in response to determining that the output signal is above a second threshold.

For purposes of illustration, consider an example scenario where the power generator is a wind farm, the target SOC of an energy storage device is initially set to 50% capacity, and the current SOC of the energy storage device is 50% capacity, e.g., as measured by a sensor on the energy storage device. When the wind dies, the power output of the wind farm goes down. In response, the control system reduces the target SOC to 40% capacity. After a period of time passes, the current SOC of the energy storage device falls to 40% capacity.

At 40% capacity, the power management system is better situated to handle sudden increases in wind speed. When the wind speed does increase, the power management system provides a ramp rate mitigation service by charging the energy storage device, and the current SOC of the storage device rises to 60% capacity. In response to the wind speed increasing for a specified period of time, the control system increases the target SOC, e.g., so that the power management system may be better situated to handle decreases in wind speed.

The capacity of an energy storage device can be defined by minimum and maximum rated charge levels that do not necessarily describe the entire potential range of charge levels of the energy storage device. For example, the minimum rated charge level of a lead acid battery may be 20% of the actual maximum capacity to potentially improve the expected life cycle of the battery. In this case, a current SOC of 50% would refer to the midpoint between the minimum rated charge level (20%) and the maximum rated charge level (100%), or 60%.

In some implementations, the control system is implemented by a real-time processing system that executes the target SOC control routine and a controller, e.g., a Programmable Automation Controller (PAC) or Programmable Logic Controller (PLC), that executes the target SOC modifier routine. The control system can include one or more optically-isolated signal conditioner (OSIC) boards that condition signals from the energy storage devices or the power generator or both and protect the control system from electrical damage. In some other implementations, the control system is implemented on a single computer system.

Figure 2:
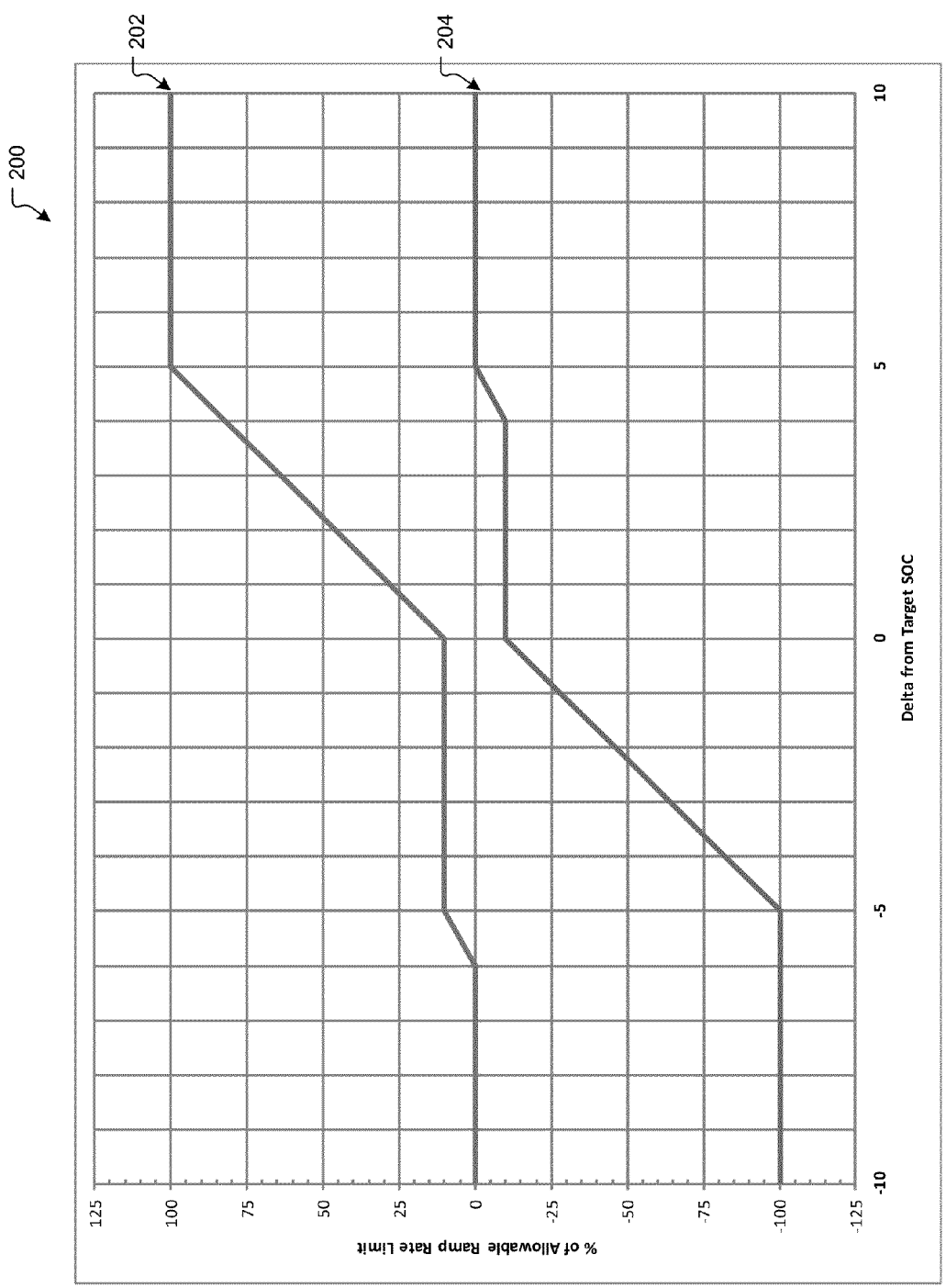
FIG. 2 is a chart illustrating some parameters of an example target SOC control routine executed by a control system.

FIG. 2 is a chart 200 illustrating some parameters of an example target SOC control routine executed by a control system. The chart plots the difference between a current SOC and a target SOC on the horizontal axis and a percentage of an allowable ramp rate limit on the vertical axis.

The percentage of the allowable ramp rate limit refers to two specified ramp rate limits, an increase limit and a decrease limit. The allowable ramp rate limit can be specified by a grid operator, a power purchase agreement (PPA), or an interconnection agreement, for example. An upper line 202 illustrates a first threshold for charging an energy storage device and a lower line 204 illustrates a second threshold for discharging an energy storage device.

In operation, the control system determines the difference between the current SOC and the target SOC and also determines the rate of change of the power output of a power generator. The control system divides that rate of change by the allowable ramp rate limit (the increase limit if increasing and the decrease limit if decreasing) to determine the percentage of the allowable ramp rate limit.

If the determined percentage of the allowable ramp rate limit is greater than the first threshold, as given by the upper line at the determined difference, the control system determines to charge the energy storage device to curb the rate at which power output is increasing. If the determined percentage of the allowable ramp rate limit is less than the second threshold, as given by the lower line at the determined difference, the control system determines to discharge the energy storage device to curb the rate at which power output is decreasing.

For purposes of illustration, consider an example scenario where the current SOC is 50% capacity and the target SOC is 50% capacity. The difference is 0%. The first threshold is 10% of the increase limit and the second threshold is −10% of the decrease limit. If the power output is increasing at greater than 10% of the increase limit, the control system will charge the energy storage device. If the power output is decreasing at greater than 10% of the decrease limit, the control system will discharge the energy storage device.

Consider a different example scenario where the current SOC is 45% capacity and the target SOC is 50% capacity. The difference is −5%. The first threshold is 10% of the increase limit and the second threshold is −100% of the decrease limit. If the power output is increasing at more than 10% of the increase limit, the control system will charge the energy storage device. If the power output is decreasing at more than the decrease limit, the control system will discharge the energy storage device.

Figure 3:
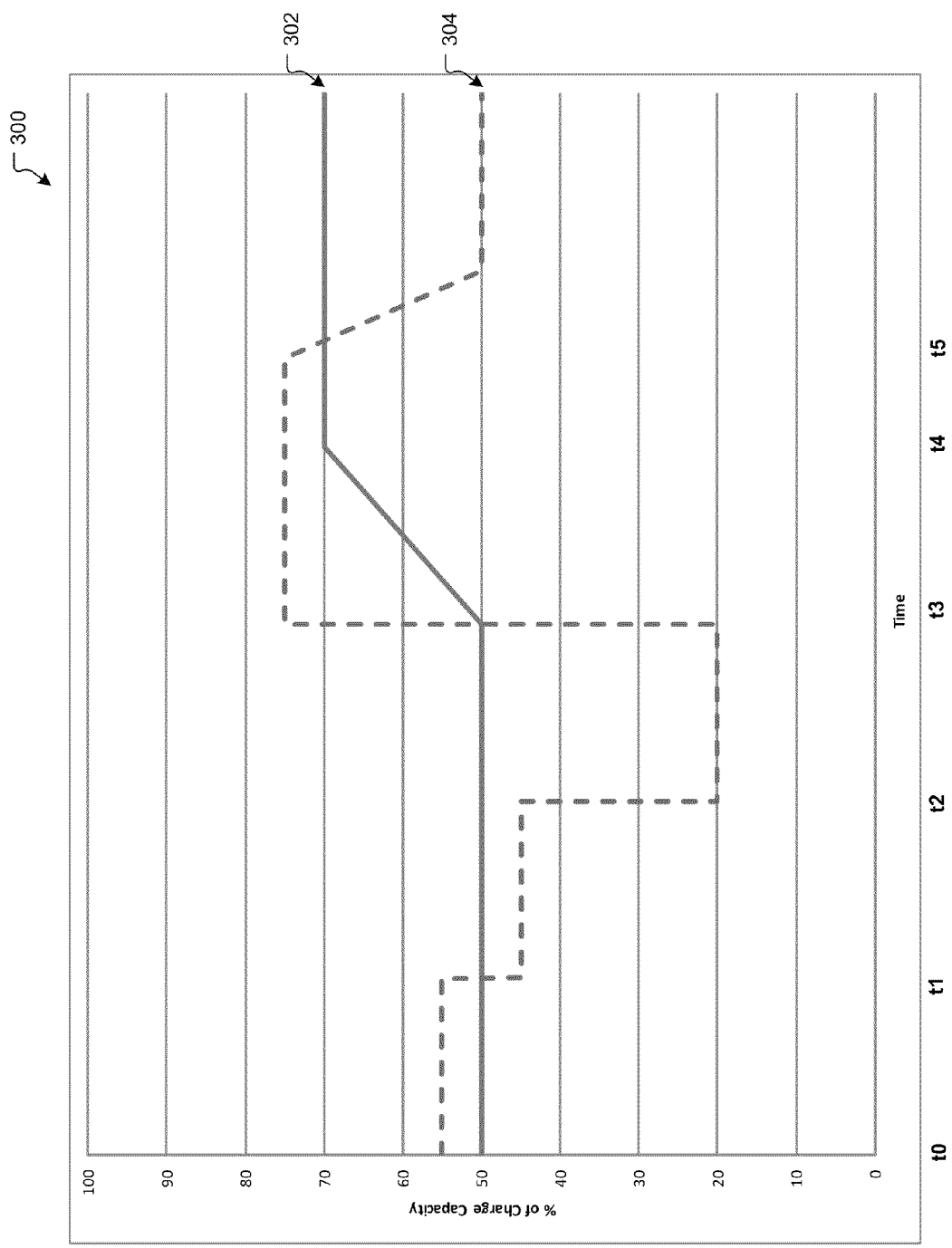
FIG. 3 is a chart illustrating an example scenario where an example target SOC modifier routine executed by a control system modifies a target SOC.

FIG. 3 is a chart illustrating an example scenario where an example target SOC modifier routine executed by a control system modifies a target SOC. The chart plots a timeline on the horizontal axis and a percentage of charge capacity on the vertical axis.

A first line 302 illustrates the current SOC of an energy storage device and a second line 304 illustrates the target SOC of a target SOC control routine controlling the charging and discharging of the energy storage device. A control system executing a target SOC modifier routine modifies the target SOC at some points in time, e.g., in response to determining that the power output is outside a specified range or outside the specified range for a specified amount of time.

For purposes of illustration, suppose that the target SOC control routine uses the thresholds illustrated in FIG. 2. Further suppose that, during the times illustrated on the chart, the power output of the power generator is increasing at a constant rate of 10% of the increase limit described above with reference to FIG. 2.

At time t0, the current SOC is 50% of capacity and the target SOC is 55% of capacity. The difference between the current and target SOC is −5%, and, referring to FIG. 2, the allowed ramp rate is 10% of the increase limit. Since, in this example, the power output is increasing at 10% of the increase limit, the target SOC control routine does not charge or discharge the energy storage device.

At time t1, the target SOC modifier routine decreases the target SOC to 45% of capacity. The difference between the current and target SOC is 5%, and referring to FIG. 2, the allowed ramp rate is still 10% of the increase limit, so the target SOC control routine does not charge or discharge the energy storage device.

At time t2, the target SOC modifier routine decreases the target SOC to 20% of capacity. The difference between the current and target SOC is 30%, and referring to FIG. 2, the allowed ramp rate is 100% of the increase limit, so the target SOC control routine does not charge or discharge the energy storage device.

At time t3, the target SOC modifier routine increases the target SOC to 75% of capacity. The difference between the current and target SOC is −25%, and referring to FIG. 2, the allowed ramp rate is 0% of the increase limit, so the target SOC control routine charges the energy storage device. The current SOC begins rising.

At time t4, the current SOC reaches 70%, and the difference between the current and target SOC is −5%. Referring to FIG. 2, the allowed ramp rate limit is 10%, and since the power output is increasing at 10% in this example, the target SOC control routine ceases charging the energy storage device.

At time t5, the target SOC modifier routine decreases the target SOC to 50% of capacity. The difference between the current and target SOC is 20%, and referring to FIG. 2, the allowed ramp rate is 10% of the increase limit, so the target SOC control routine does not charge or discharge the energy storage device.

Figure 4:
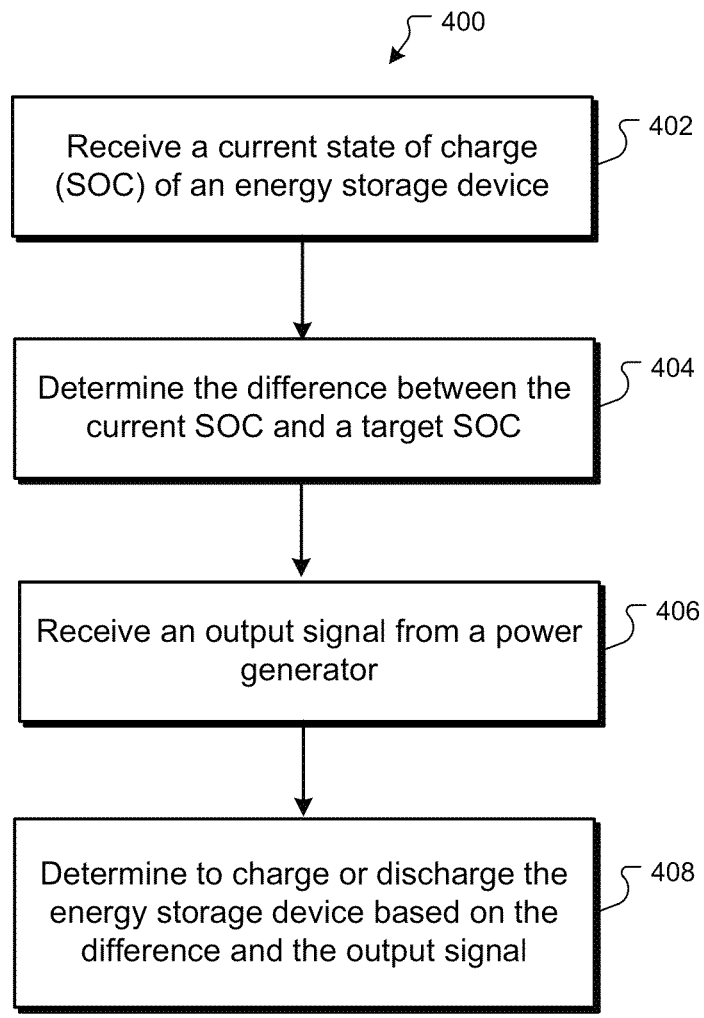
FIG. 4 is a flow diagram of a method performed by a control system executing a target SOC control routine.

FIG. 4 is a flow diagram of a method 400 performed by a control system executing a target SOC control routine. For example, the control system can be the control system 104 of FIG. 1 executing the target SOC control routine 114 of FIG. 1.

The control system receives a current SOC of an energy storage device (402). The control system determines the difference between the current SOC and a target SOC (404). The control system receives an output signal, e.g., from a power generator or a measurement device coupled to the power generator (406). The control system determines to charge or discharge the energy storage device based on the difference and the output signal (408).

Figure 5:
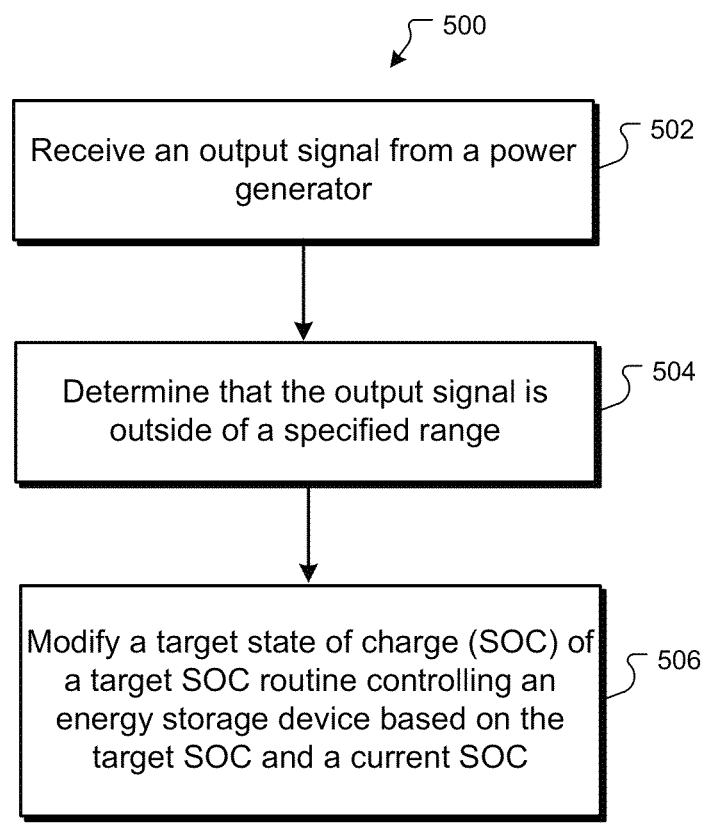
FIG. 5 is a flow diagram of a method performed by a control system executing a target SOC modifier routine.

FIG. 5 is a flow diagram of a method 500 performed by a control system executing a target SOC modifier routine. For example, the control system can be the control system 104 of FIG. 1 executing the target SOC modifier routine 116 of FIG. 1.

The control system receives an output signal, e.g., from a power generator or a measurement device coupled to the power generator (502). The control system determines that the output signal is outside of a specified range or outside of a specified range for a specified period of time (504). In response, the control system modifies a target SOC of a target SOC control routine controlling an energy storage device based on the target SOC and a current SOC of the energy storage device (506).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

What is claimed is:

1. A power management system comprising:
an energy storage device; and
a control system coupled to the energy storage device, wherein the control system is configured to:
execute a control routine to determine whether to charge or discharge the energy storage device, including determining a difference between a current state of charge of the energy storage device and a target state of charge of the energy storage device, receiving an output signal characterizing an output rate of a power generator, and determining to charge or discharge the energy storage device based on the difference and the output signal;
determine that the output signal is outside of a specified range for a specified period of time; and
modify the target state of charge of the energy storage device in response to determining that the output signal is outside of the specified range for the specified period of time.

2. The power management system of claim 1, wherein the control system is configured to: determine that the output signal is below a first threshold and, in response, reduce the target state of charge of the energy storage device; and
determine that the output signal is above a second threshold and, in response, increase the target state of charge of the energy storage device.

3. The power management system of claim 1, wherein the power generator is configured to provide intermittent power to a load, and wherein the energy storage device is configured to source power to the load when discharging and sink power from the power generator when charging.

4. The power management system of claim 3, wherein the power generator comprises one or more wind turbines, the load is an electrical grid, and the energy storage device comprises one or more batteries, each battery coupled to a respective bidirectional power conversion system.

5. The power management system of claim 4, wherein receiving the output signal comprises receiving a value from the power generator or a measurement device coupled to the power generator indicating an average or instantaneous power output from the wind turbines.

6. The power management system of claim 1, wherein determining to charge or discharge the energy storage device based on the difference and the output signal comprises:
determining that the output signal indicates that the power generator is generating power at an increasing rate above a first threshold rate and, in response, charging the energy storage device; and
determining that the output signal indicates that the power generator is generating power at a decreasing rate below a second threshold rate and, in response, discharging the energy storage device.

7. The power management system of claim 6, wherein the control system is configured to, in executing the control routine, decrease the first threshold rate or the second threshold rate or both when the current state of charge of the energy storage device is below the target state of charge of the energy storage device.

8. The power management system of claim 6, wherein the control system is configured to, in executing the control routine, increase the first threshold rate or the second threshold rate or both when the current state of charge of the energy storage device is above the target state of charge of the energy storage device.

9. The power management system of claim 1, wherein the control system comprises a real-time processing system to execute the control routine.

10. A method performed by a control system of a power management system, the method comprising:
executing a control routine to determine whether to charge or discharge an energy storage device coupled to a load, including:
determining a difference between a current state of charge of the energy storage device and a target state of charge of the energy storage device;
receiving an output signal characterizing an output rate of a power generator coupled to the load; and
determining to charge or discharge the energy storage device based on the difference and the output signal;
determining that the output signal is outside of a specified range for a specified period of time; and
modifying the target state of charge of the energy storage device in response to determining that the output signal is outside of the specified range for the specified period of time.

11. The method of claim 10, wherein determining that the output signal is outside of the specified range and modifying the target state of charge of the energy storage device comprises:
- determining that the output signal is below a first threshold and, in response, reducing the target state of charge of the energy storage device; and
- determining that the output signal is above a second threshold and, in response, increasing the target state of charge of the energy storage device.

12. The method of claim 10, wherein the power generator is configured to provide intermittent power to the load, and wherein the energy storage device is configured to source power to the load when discharging and sink power from the power generator when charging.

13. The method of claim 12, wherein the power generator comprises one or more wind turbines, the load is an electrical grid, and the energy storage device comprises one or more batteries, each battery coupled to a respective bidirectional power conversion system.

14. The method of claim 13, wherein receiving the output signal from the power generator comprises receiving a value indicating an average or instantaneous power output from the wind turbines.

15. The method of claim 10, wherein determining to charge or discharge the energy storage device based on the difference and the output signal comprises:
- determining that the output signal indicates that the power generator is generating power at an increasing rate above a first threshold rate and, in response, charging the energy storage device; and
- determining that the output signal indicates that the power generator is generating power at a decreasing rate below a second threshold rate and, in response, discharging the energy storage device.

16. The method of claim 15, further comprising decreasing the first threshold rate or the second threshold rate or both when the current state of charge of the energy storage device is below the target state of charge of the energy storage device.

17. The method of claim 15, further comprising increasing the first threshold rate or the second threshold rate or both when the current state of charge of the energy storage device is above the target state of charge of the energy storage device.

18. A method performed by a first control system of a power management system, the method comprising:
- receiving an output signal characterizing an output rate of a power generator coupled to a load;
- determining that the output signal is outside of a specified range for a specified period of time; and
- sending a modified target state of charge to a second control system for an energy storage device in response to determining that the output signal is outside of the specified range for the specified period of time, wherein the second control system is executing a control routine to determine whether to charge or discharge the energy storage device coupled to the load, including:
  - determining a difference between a current state of charge of the energy storage device and the modified target state of charge of the energy storage device;
  - receiving an output signal from a power generator coupled to the load; and
  - determining to charge or discharge the energy storage device based on the difference and the output signal.

* * * * *